though valved pipe 39 to pump 41, by which the mixture is forced through pipe 42 and vertical section 43 back into the lower end of reactor 1. Heat is supplied by means of the helix 45 to keep the vertical section 43 at a temperature above the melting point of the metal.

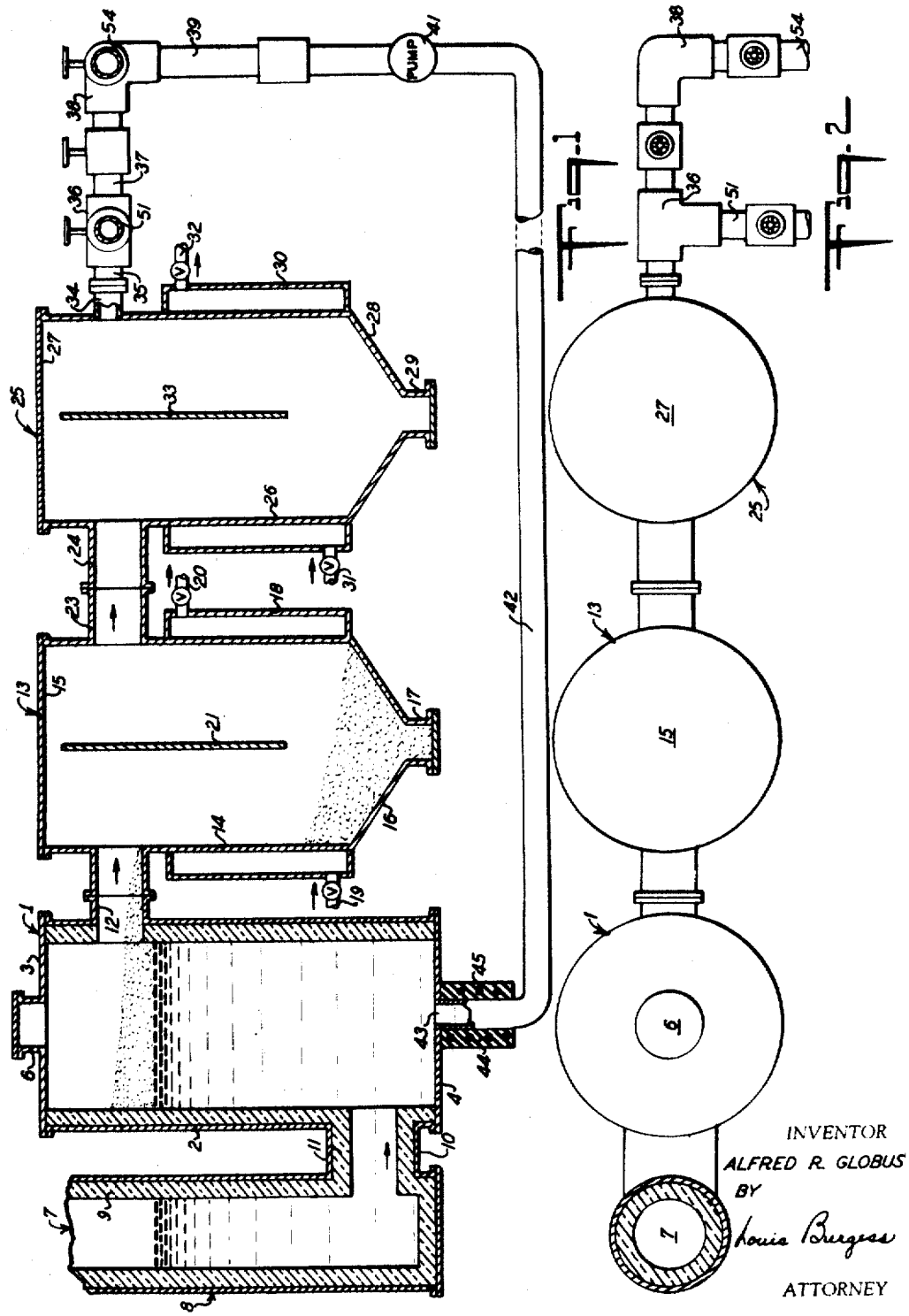

United States Patent Office 2,812,240
Patented Nov. 5, 1957

2,812,240
PROCESS OF MAKING BORON NITRIDE

Alfred R. Globus, Forest Hills, N. Y., assignor to United International Research, Inc., a corporation of New York Application February 17, 1955, Serial No. 488,920

1 Claim. (Cl. 23—191)

This invention is a new and useful process of making boron nitride and will be fully understood from the following description read in conjunction with the drawing in which:

Fig. 1 is a diagrammatic vertical section through apparatus in which the invention may be carried into effect; and Fig. 2 is a plan view of the apparatus which appears, in part, in Fig. 1.

Referring to the figures, reactor 1 comprises vertically oriented tubular section 2 carrying top closure 3 and bottom closure 4. Reactor 1 carries refractory lining 5, preferably of bauxite brick or bonded alumina. Top closure 3 carries manhead 6. A liquid, for example, a metal in liquid phase, may be supplied to the interior of reactor 1 by introducing it into the top of riser 7 consisting of tubular shaft 8 provided with refractory lining 9 connected through horizontal pipe 10 provided with refractory lining 11 communicating with the base of reactor 1. Reactor 1 is connected through side outlet 12 with collector 13. The collector comprises a vertically oriented tubular section 14 carrying top closure 15 and cone bottom 16 provided with manhead 17. The closure may be held at a predetermined temperature by means of the jacket 18, into which a fluid may be introduced through the valved pipe 19 passing off through valved pipe 20. The collector 13 carries baffle 21 vertically oriented as indicated. Collector 13 discharges through outlet 23 connected to pipe 24, which is part of condenser 25. This condenser comprises vertically oriented tubular section 26 carrying top closure 27 and cone bottom 28 provided with manhead 29. Condenser 25 may be held at a predetermined temperature by means of jacket 30 into which a fluid may be introduced through valved pipe 31 passing off through valved pipe 32. Condenser 25 is provided with baffle 33 centraly positioned as shown. Material passes off from condenser 25 through outlet 34 discharging into pipe 35, which is in turn connected to T 36 (Fig. 2). T 36 is connected through valved pipe 37, which in turn is connected to double elbow 38. From double elbow 38 the valved pipe 39 passes downwardly discharging into pump 41, by which fluid may be forced through valved pipe 42 back into the base of reactor 1. The vertical section 43 of this pipe carries insulation 44 within which is mounted the helix 45, by which the vertical section 43 may be inductively heated to prevent metal solidifying at this point.

Referring to Fig. 2, T 36 is connected to valved pipe 51. The double elbow 38 is connected horizontally to valved pipe 54.

In operation the manhead 6 in reactor 1 is unplated and a burner is inserted through the same by means of which the interior of the reactor is heated to a red heat. Simultaneously nitrogen is introduced through valved pipe 53 to purge the condensers of any oxygen initially present. Following this manhead 6 is closed and aluminum in liquid phase is introduced by pouring it into riser 7 in amount sufficient to fill the reactor almost up to the point at which it would overflow into the collector 13. Following this the introduction of nitrogen through valved pipe 51 is continued and boron trichloride in gas phase is introduced through valved pipe 54. These comingle in the double elbow 38 passing downwardly The nitrogen introduced with the boron trichloride should be at least stoichiometrically sufficient to react with the boron present in the trichloride, with formation of boron nitride (BN). In practice a substantial excess of nitrogen will be used to insure completion of the desired reaction and the maintenance of a nitrogen atmosphere in the free space in the upper end of reactor 1. The boron trichloride will react immediately with the aluminum, with production of aluminum chloride (AlCl₃) and boron, which boron reacts immediately with the nitrogen present forming boron nitride. The aluminum chloride which is in gas phase passes on into the condenser 25. The boron nitride which is in solid phase collects as a layer of powder on top of the liquid aluminum and after sufficient has accumulated, will flow continuously over into the collector 13. This collector is held at a temperature above the sublimation temperature of aluminum chloride by the circulation of a heating fluid in jacket 18 to insure that the aluminum chloride will not condense at this point. The boron nitride which accumulates in the collector 13 may be intermittently removed through the manhead 17 or through a gate valve which may be connected to the cover of the manhead. Condenser 25 is held at a temperature below the sublimation temperature of aluminum chloride by the circulation of a cooling fluid through jacket 30. The aluminum chloride may be intermittently removed from the condenser 25 through manhead 29.

Any residual nitrogen will pass on out of the condensers through pipe 34 comingling in pipe 37 with that simultaneously introduced through valved pipe 51. Any unreacted boron trichloride passing out of the condensers through pipe 34 will comingle in double elbow 38, with additional boron trichloride simultaneously introduced through valved pipe 54. The amount of nitrogen introduced through valved pipe 51 and the amount of boron trichloride introduced through valved pipe 54 are coordinated to maintain the desired reaction velocity in reactor 1 and to maintain an excess of nitrogen in the reactor to insure that the boron produced will react completely or substantially completely to the nitride.

I claim:

Process of making boron nitride which comprises maintaining a body of aluminum in liquid phase in a reactor connected to a collector, which collector discharges into a condenser, contacting said aluminum with a mixture of boron trichloride and nitrogen by passing said mixture upwardly through the same, thereby generating aluminum chloride in gas phase and a layer of boron nitride in solid phase, conducting away the aluminum chloride so formed in vapor phase and continuing the process until the boron nitride blows into said collector, maintaining said collector at a temperature above the sublimation point of aluminum chloride, maintaining said condenser at a temperature below the sublimation point of aluminum chloride, removing boron nitride from said collector and removing aluminum chloride from said condenser.

References Cited in the file of this patent

UNITED STATES PATENTS

| 1,241,796 | Weaver | Oct. 2, 1917 |
| 2,313,410 | Walther | Mar. 9, 1943 |
| 2,685,501 | Spevack | Aug. 3, 1954 |

OTHER REFERENCES

Kroll: "Zeitschrift für Anorganische and Allgemeine Chemie," vol. 102, part 1, pages 17–25 (1918).

UNITED STATES PATENT OFFICE
CERTIFICATE OF CORRECTION

Patent No. 2,812,240    November 5, 1957

Alfred R. Globus

It is hereby certified that error appears in the printed specification of the above numbered patent requiring correction and that the said Letters Patent should read as corrected below.

Column 1, line 27, for "shaf" read -- shaft --; line 48, for "T 36 (Fig. 2). T 36" read -- tee 36 (Fig. 2). Tee 36 --; line 57, for "T 36" read -- tee 36 --; column 2, line 57, for "blows" read -- flows --.

Signed and sealed this 24th day of December 1957.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,812,240 November 5, 1957

Alfred R. Globus

It is hereby certified that error appears in the printed specification of the above numbered patent requiring correction and that the said Letters Patent should read as corrected below.

Column 1, line 27, for "shaf" read -- shaft --; line 48, for "T 36 (Fig. 2). T 36" read -- tee 36 (Fig. 2). Tee 36 --; line 57, for "T 36" read -- tee 36 --; column 2, line 57, for "blows" read -- flows --.

Signed and sealed this 24th day of December 1957.

(SEAL)
Attest:

KARL H. AXLINE
Attesting Officer

ROBERT C. WATSON
Commissioner of Patents